P. E. HOLT.
STEERING CLUTCH.
APPLICATION FILED MAY 20, 1918.

1,344,399.

Patented June 22, 1920.
2 SHEETS—SHEET 1.

INVENTOR.
Pliny E. Holt,
BY Strong & Townsend
ATTORNEYS

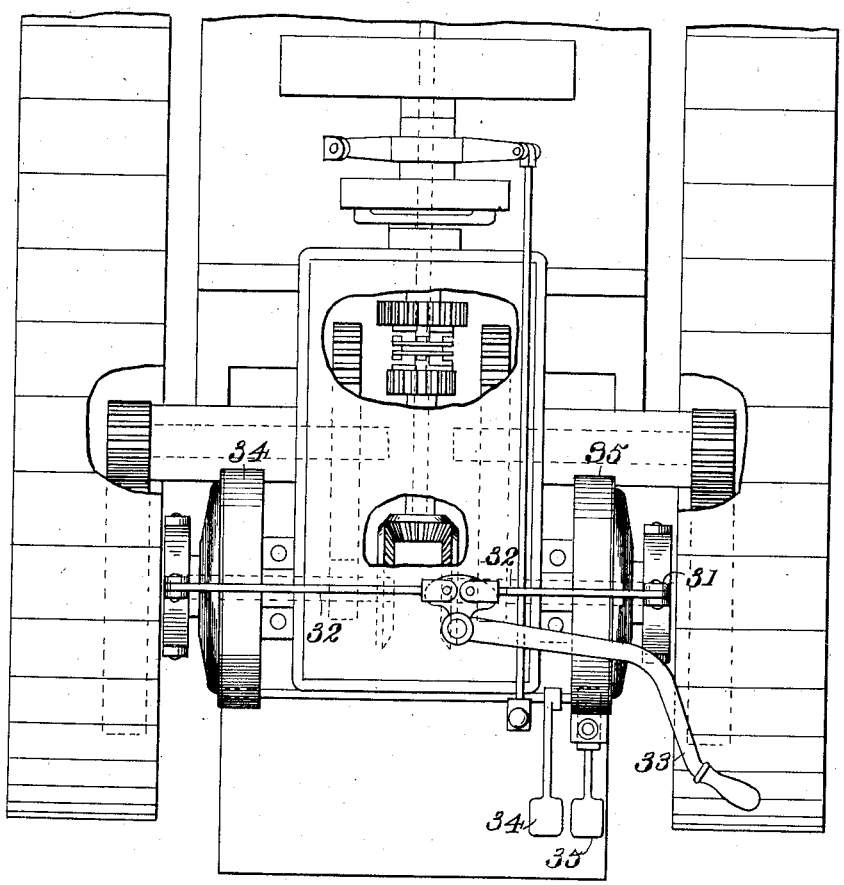

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

STEERING-CLUTCH.

1,344,399. Specification of Letters Patent. Patented June 22, 1920.

Application filed May 20, 1918. Serial No. 235,645.

*To all whom it may concern:*

Be it known that I, PLINY E. HOLT, a citizen of the United States, residing at Stockton, in the county of San Joaquin and State of California, have invented new and useful Improvements in Steering-Clutches, of which the following is a specification.

This invention relates to multiple disk clutches; and has for its object to simplify and improve the construction and operation of devices of the type shown and described in copending applications Serial Number 141,772, filed January 11th, 1917, and Serial Number 189,402, filed September 1st, 1917. The invention pertains especially to steering clutches in conjunction with chain track tractors illustrated, for instance, in Patent No. 1,184,705 of May 23rd, 1916, wherein is illustrated a machine to which the present invention is directly applicable.

The clutches referred to in said co-pending applications, after a certain amount of use, must be manually adjusted to take up wear occurring in the friction members. According to the present invention, this adjustment is taken care of automatically by means of springs having sufficient tension to expand in accordance with the wear of the friction members. This feature, together with the particular construction and arrangement of the parts employed, produces a clutch which may be continuously operated without attention, its working parts being permanently kept free from water or dust. A further object is to provide a dust and dirt-proof and waterproof clutch for which there has been a great and heretofore unfulfilled demand.

The present invention also provides a clutch-actuating mechanism, which is so constructed that it may be provided with radial and thrust anti-friction means wholly incased within the clutch-actuating mechanism.

A preferred embodiment of the invention is exemplified in the following description and illustrated in the accompanying drawings, in which—

Fig. 2 is a plan view of the rear portion of a traction engine showing the application of the invention.

Figure 1:
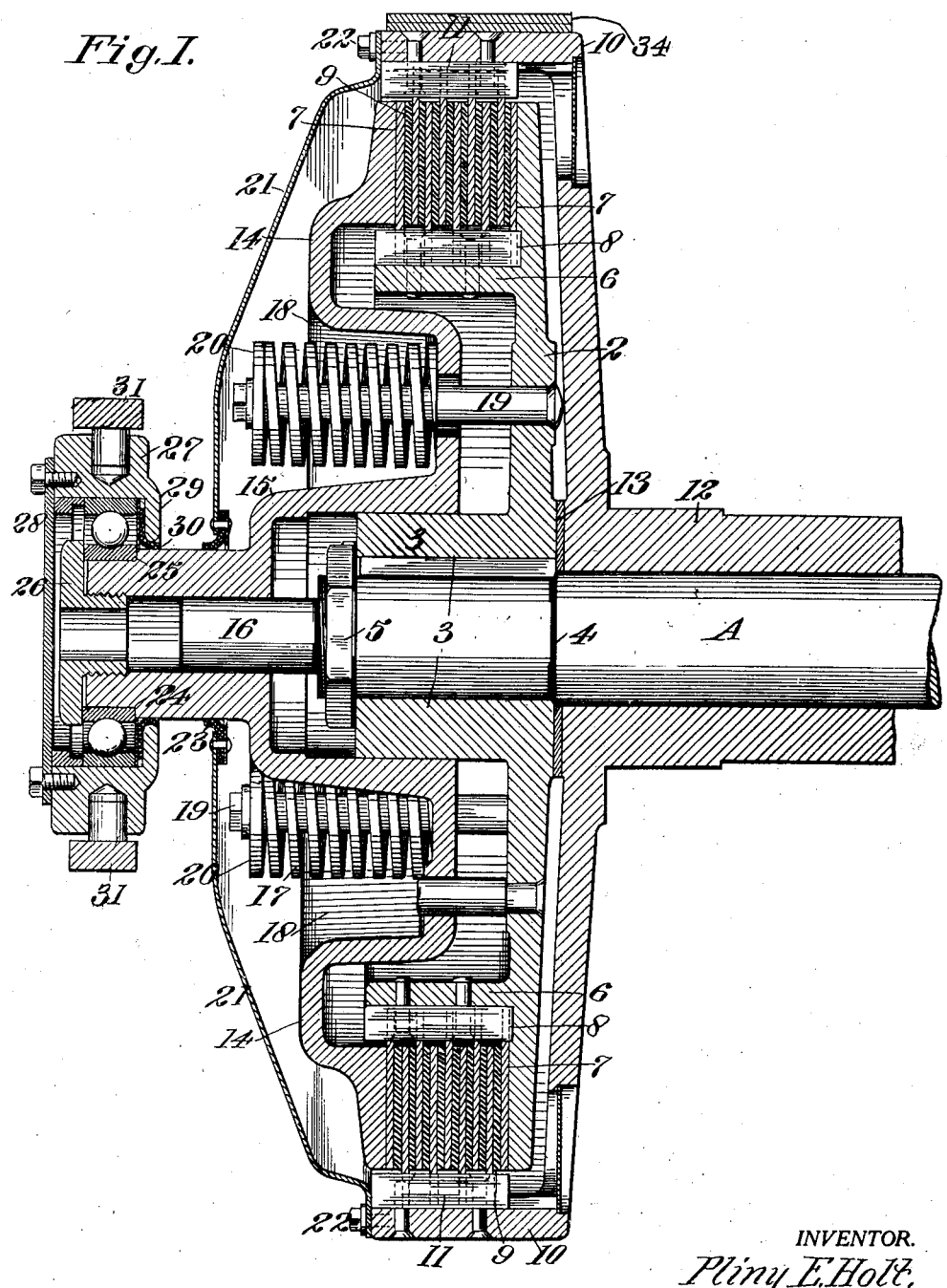
Figure 1 is a longitudinal sectional view of a clutch embodying the invention.

In this figure, a driving means is shown, comprising a drive shaft A and a circular driving member 2 provided with a cylindrical hub 3 fitting over the drive shaft A and held, by means of a lock nut 5, against a shoulder 4 formed on said shaft. Near the outer edge of the driving member 2 is an annular flange 6, to which is secured a set of friction disks 7, these disks being made to rotate with the driving member 2 by means of keys 8. The disks 7 are arranged in alternate relation with a similar set of disks 9 secured interiorly of a drum-like driven member 10 by means of keys 11. The driven member 10 is provided with a sleeve-like hub 12, fitting over the drive shaft A. A floating washer 13, carried on shaft A, is placed between the driving member 2 and the driven member 10 to keep these parts properly spaced apart. A circular pressure device 14 having a central hub 15, the inner end of which fits over the hub 3 and the outer end of which fits over a reduced extension 16 of the shaft A, serves to hold the friction disks in operative engagement.

In order to compress the friction disks 7 and 9 between the driving member 2 and the pressure device 14 a series of springs 17 is provided; these springs being carried in an annular depression 18 formed adjacent to the hub 15. The outer ends of the springs are connected to the driving member 2 by means of bolts 19 secured in the driving member and extending through the pressure device and springs to the retaining washers 20. When the clutch is originally assembled the springs 17 are given a sufficient tension to automatically expand and take up whatever wear of the friction disks may occur.

The above described mechanism is inclosed by means of a circular cover 21, secured at its outer edge to the driven member 10 by means of bolts 22. The cover 21 is provided with a central opening through which the hub 15 extends. A leather packing 23 is fitted to this opening, thus protecting the interior mechanism against the admission of foreign materials.

Secured on the outer end of the hub 15 is a clutch-actuating mechanism by which the pressure device 14 may be retracted to disengage the clutch, said mechanism comprising anti-friction means capable of withstanding lateral or radial loads. In the form of the clutch here illustrated, this means consists of an annular ball-bearing having an inner ring 24 fitting over the end of the hub 15 and held, by means of a nut 26, against a shoulder 25 formed on said hub. The outer ring of the annular ball-bearing is secured interiorly of a clutch-actuating collar 27, the outer side of which is inclosed by means of a plate 28 and the inner side of which is inclosed by means of a flange 29 fitted with a leather packing 30.

In Fig. 2 the invention is shown as applied in the drive connections of a chain track tractor of well-known make; each clutch collar 27 being controlled by a lever 31 connected by links 32 to the steering lever 33. Each clutch is also under foot control by respective brakes 34 and 35. The clutch-actuating mechanism thus provided is obviously well protected against the admission of water, dust or other foreign materials.

It is manifest that many changes in the construction and arrangement of the various parts may be made without departing from the spirit of my invention as disclosed in the appended claims.

Having thus described my invention, what I claim and desire to secure by Letters Patent is—

1. A clutch mechanism comprising a driving shaft, a head fixed upon the driving shaft, a set of clutch disks carried thereby, a drum inclosing said head and freely turnable on the driving shaft, a set of disks carried by the drum to coöperate with the first mentioned set of disks, a pressure plate carried by the head and operable against the disks at the side opposite the head, stud bolts fixed to the head and passing through apertures on the pressure plate, springs on the stud bolts to force the pressure plate against the clutch disks, a removable cover plate closing the drum at the side adjacent to the pressure plate, a hub on the pressure plate carried by and slidable on the driving shaft and projecting through the cover plate, a dust excluding packing between the hub and cover plate, and means connected with the hub portion of said pressure plate for actuating the latter to control the operation of the clutch.

2. A clutch mechanism comprising a driving shaft, a head fixed upon the driving shaft, a set of clutch disks carried thereby, a drum inclosing said head and freely turnable on the driving shaft, a set of disks carried by the drum to coöperate with the first mentioned set of disks, a pressure plate carried by the head and operable against the disks at the side opposite the head, stud bolts fixed to the head and passing through apertures on the pressure plate, springs on the stud bolts to force the pressure plate against the clutch disks, a removable cover plate closing the drum at the side adjacent to the pressure plate, a hub on the pressure plate carried by and slidable on the driving shaft and projecting through the cover plate, a dust excluding packing between the hub and cover plate, and means connected with the hub portion of said pressure plate for actuating the latter to control the operation of the clutch, said actuating means comprising a collar surrounding the end of the hub, anti-friction thrust and radial bearings between the collar and hub, a dust excluding packing between the collar and hub at the inner face of the collar and a closure plate on the outer face of the collar.

In testimony whereof I have hereunto set my hand in the presence of two subscribing witnesses.

PLINY E. HOLT.

Witnesses:
  JOHN H. HERRING,
  W. W. HEALEY.